March 27, 1951     H. W. AUGUSTADT     2,546,814
INDICATING APPARATUS Filed Sept. 5, 1947     4 Sheets-Sheet 1

INVENTOR
H. W. AUGUSTADT
BY
Robert J. Pluskey
ATTORNEY

March 27, 1951 — H. W. AUGUSTADT — 2,546,814
INDICATING APPARATUS
Filed Sept. 5, 1947 — 4 Sheets-Sheet 2

INVENTOR
H. W. AUGUSTADT
BY Robert J. Kinskey
ATTORNEY

March 27, 1951 H. W. AUGUSTADT 2,546,814
INDICATING APPARATUS
Filed Sept. 5, 1947 4 Sheets-Sheet 3

FIG. 3A

INVENTOR
H. W. AUGUSTADT
BY
Robert J. Pluskey
ATTORNEY

March 27, 1951     H. W. AUGUSTADT     2,546,814
INDICATING APPARATUS Filed Sept. 5, 1947     4 Sheets-Sheet 4

INVENTOR
H. W. AUGUSTADT
BY
Robert J. Pluskey
ATTORNEY

Patented Mar. 27, 1951

2,546,814

UNITED STATES PATENT OFFICE 2,546,814

INDICATING APPARATUS

Herbert W. Augustadt, Westfield, N. J., assignor to Bell Telephone Laboratories, Incorporated, New York, N. Y., a corporation of New York Application September 5, 1947, Serial No. 772,429

3 Claims. (Cl. 175—381)

This invention relates to electrical indicating apparatus, and has particular application to such apparatus when adapted to accurately measure the time delay between a reference voltage pulse and a delayed voltage pulse.

It is an object of the invention to improve the accuracy of measurement of the time delays introduced into voltage pulse producing circuit arrangements.

Range indicating mechanisms for use with radiant energy distance determining systems usually function by determining the time delay interval between energy pulses which are propagated to a reflecting object and corresponding reflected portions of these pulses that are received from the object. This delay interval may be determined by initiating in the range indicator a voltage pulse coincidentally with an outgoing energy transmission and delaying the recreation of this pulse by a suitable time interval until its recreation is coincident with the receipt of the reflected portion of the transmitted energy. By accurately determining the introduced time delay interval, and through well-known conversion relations, the elapsed time interval may be expressed as a conventional linear distance to the reflecting object. In practice, the indicating dial of most range measuring devices is calibrated in yards over sufficient range to accommodate the capabilities of the system with which it is to be associated.

Because the electrical delays inherent in the transmitting and receiving branches of such distance determining systems will vary as between systems, it is expedient in the manufacture of the range indicating mechanism to calibrate its distance indicating scale on a relative basis. That is, to adjust the time delays introduced by the range measuring device for discrete positions such that their differences are equivalent to the differences between the indicated linear distances. By so adjusting the time delays for various settings or positions of the indicating mechanism, such that their differences are equivalent to the differences between the corresponding indicated linear distances, the adjustment for the indication of absolute distances may be postponed until the range indicating unit is associated with an individual system at which time the system electrical delays may be considered and compensated.

In following a method such as has been described, it is apparent that the accuracy of measurement of the absolute distance to a reflecting object will, to a large extent, be dependent upon the accuracy with which the incremental delay differences were determined, and the corresponding adjustments made in the relative distance measuring calibrations. This accuracy is in turn dependent upon the potential accuracy of the measuring device.

In accordance with this invention, an unusual degree of synchronism and coincidence is achieved between the corresponding pulses derived from a number of different pulse sources. These pulses may then be used to cooperatively perform essential functions in determining the differences between different delay intervals with an unusual degree of accuracy.

The invention makes possible considerably increased accuracy in determining the degrees of coincidence between one set of recurring pulses when used as reference, or marker pulses, and a second set of delayed pulses, of which it is wished to determine the amount by which they are actually delayed with respect to conjugate pulses of the same series of pulses when subjected to different amounts of indicated delay.

In accordance with one specific embodiment of the invention, which will be shown and described hereinafter for illustrative purposes, a distinctive and novel relaxation oscillator of the multivibrator type is employed for the generation of an electrical wave having a frequency which is an integral submultiple of the frequency of the wave generated by a master constant frequency timing oscillator.

This relaxation oscillator performs a dual purpose in that it acts as the source of two voltage waves each of which may be used in the selection of individual pulses from two series of recurring voltage pulses. These selected pulses may then be variably delayed with respect to one another.

In order to increase the accuracy of the frequency step-down operation performed by this relaxation oscillator, a novel and distinctive arrangement is employed in one of its control grid-cathode circuits to greatly increase the slope of the grid charging voltage at the time for reversing the current conduction condition of the oscillator branches.

The manner in which the object of this invention is realized, and the advantages secured thereby, may best be appreciated from the following description of a preferred embodiment of the invention when considered in conjunction with the attached drawings in which.

Figure 1:
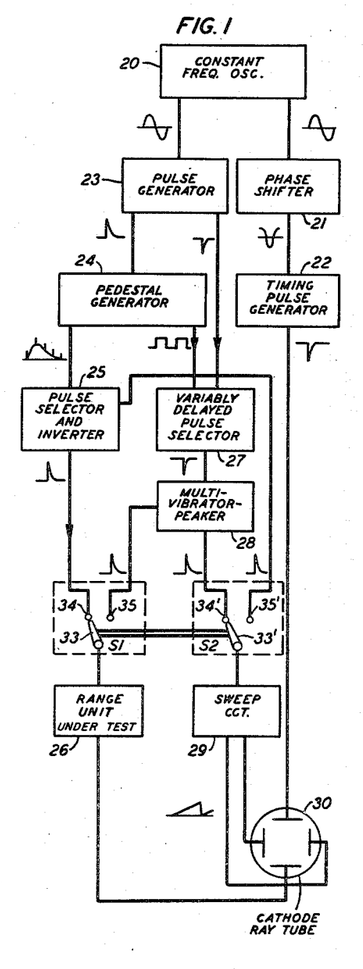
Fig. 1 is a block diagram of an arrangement in accordance with the invention for calibrating a range indicating mechanism.

Referring to Fig. 1 of the drawing, there is shown in block diagram an apparatus for calibrating a range indicating unit 26 which may be of the type previously described, and as shown, for example, in United States Patent 2,422,205, dated June 17, 1947, to L. A. Meacham. Such a range indicating unit generates a series of output pulses which, with respect to corresponding input pulses, are delayed by an amount which may be varied. The unit has as an integral part thereof a distance indicating dial, the calibration of which is to be checked, and the setting of which is determined by the amount of time delay imparted to the input pulse. Oscillator 20 generates a constant frequency wave, which in this illustrative example may be 327.80 kilocycles, as indicated by wave $a$ of Fig. 2. A frequency of 327.80 kilocycles provides a convenient standard for the intended purpose since a wave of that frequency has an interval of about 3.05 microseconds between cycles, and consequently, voltage pulses accurately derived from the same point on such a wave would have a recurrence interval of 3.05 microseconds. This interval corresponds to the time required by an electromagnetic wave to travel 500 yards to a reflecting object and for the reflected portion thereof to return to its starting point. Timing pulses so derived from successive cycles of the wave from oscillator 20 may be said to be separated by 500 yards, or delayed 500 yards with respect to each preceding pulse. The output wave $a$ of oscillator 20 may be divided into two portions, one of which is directed in unaltered form to the pulse generator 23 to be used as later discussed. The second portion of the wave is directed to a conventional continuous phase shifter 21, in which it is possible to shift its phase by any desired portion of one complete cycle.

The output product of this phase shifter, curve $b$ (Fig. 2), is a wave having the same frequency as that of curve $a$ but in which the phase may be shifted by any desired amount. This shifted wave is impressed upon a timing pulse generator 22, wherein is produced a series of negative voltage pulses $c$ (Fig. 2), the peaks of which are separated by a time interval of 3.05 microseconds, or 500 yards, as previously explained. As will be later explained in connection with Fig. 3, the voltage pulses produced in this generator 22 and in the conjugate generator 23 are derived from wave $a$, and are characterized by an unusually steep wave front and by an unusually stable relation to a designated angular position of the fundamental wave $a$. The recurring pulses $c$ may be used in the visual indicator 30 to indicate the difference existing between related pulses by applying them to one of the vertical deflection plates of the cathode-ray tube 30, on the luminescent screen of which they produce "pips" or "marks" spaced at 500-yard intervals.

Figure 2:
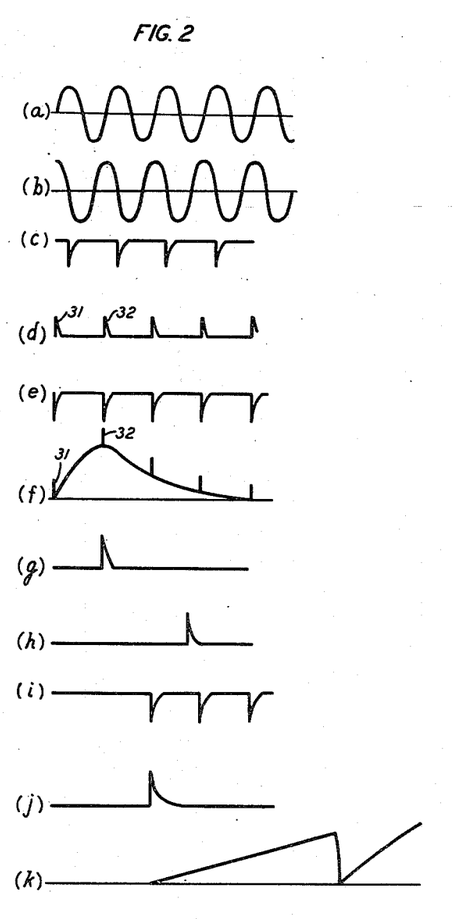
Fig. 2 consists of a series of electric wave forms to which reference will be made in explaining the operation of the calibrating arrangement of Fig. 1.

Pulse generator 23, similar in details to its conjugate member 22, is activated by the unshifted portion of the output wave of oscillator 20 to produce two voltage pulse products $d$ and $e$ (Fig. 2) of opposite polarity, but each having a frequency of recurrence equal to that of the pulses $c$ from pulse generator 22. The positively poled pulses $d$ control the multivibrator type of pedestal generator 24 to produce in addition to the customary square wave output of this type of generator (indicated in Fig. 1), a second wave having the general form of curve $f$, (Fig. 2). This second wave, although critically damped, has a fundamental frequency of about 80 kilocycles, and a repetition rate of about 480 times a second. At this point it may be noted that the multivibrator pedestal generator 24 effects a frequency division in the order of 680 to 1, since it changes the 327.80-kilocycle wave to one having a frequency of about 480 cycles per second. This frequency of unit 24 may vary by integral changes from the above rate; however, under all circumstances, the production of the wave of curve $f$ is started coincidentally with one of the positive pulses 31 of curve $d$ and the next succeeding pulse 32 of this series sits atop the wave of curve $f$ to unblock, or make conductive, the pulse selector and inverter 25. This latter unit is normally non-conductive; however, the combined potential of the wave $f$ plus the superposed positive voltage pulse 32 is sufficient to produce in this unit a single positive voltage pulse as indicated by curve $g$ (Fig. 2). This pulse is coincident with the unblocking pulse 32 which may be displaced in phase from a corresponding pulse in the series shown by curve $c$.

Assuming the position of switches $S_1$, $S_2$ to be such that wiper arms 33, 33' are in contact with the left studs 34, 34', this single positive pulse $g$ activates the range indicating unit 26 which is to be calibrated. The action of this unit is such as to delay the recreation of this pulse as pulse $h$ by a variable interval as previously explained. The delayed, or recreated pulse $h$ is directed to a vertical deflection plate of the cathode-ray tube 30 where it produces a deflection of the cathode beam in a direction opposite to that produced by the marker pulses of series $c$ which are applied to the conjugate vertical control plate. In order to determine the degree of coincidence of the conjugate deflections, it is necessary that the cathode beam be displaced horizontally as a function of time. The degree of accuracy with which this coincidence, or lack of it, may be determined will depend to a certain extent upon the speed with which this horizontal displacement may be accomplished, the accuracy of determination increasing as the interval of non-coincidence is magnified. In accordance with the invention, this objective is accomplished by delaying the start of the horizontal deflection of the beam to a time just preceding the critical period of pulse coincidence. Since only this critical period is of interest the full capabilities of the visual indicating device, including the cathode-ray tube 30, may be expended during this short interval rather than over an interval corresponding to the full delay period.

The above objective is accomplished in the following manner. As previously stated, the multivibrator pedestal generator 24 produces in addition to the pedestal wave $f$, a second, squaretopped wave (indicated in Fig. 1) which is applied to the variably delayed pulse selector 27 along with the negative voltage pulses of series $e$ that are derived from the pulse generator 23. It will be recalled that these pulses are spaced apart by 3.05 milliseconds, or 500 yards, that they are coincident with the positive voltage pulses of series $d$ and one pulse of the series is coincident with the single selected pulse $g$ (Fig. 2). Additionally, these pulses are synchronous with, though possibly phase displaced from, the negative timing, or marker, pulses of the series $c$ (Fig. 2). As will be explained in connection with Fig. 3, these negative pulses of the series $e$ are selected after an adjustable delay interval to constitute the series of negative pulses $i$ (Fig. 2) in which the first pulse of the series may be delayed after the pulse $g$ and precede the delayed pulse $h$ (Fig. 2) by a selected interval. These negative pulses are directed to a single-trip multivibrator peaker 28 to produce the single positive pulse $j$ (Fig. 2) the leading edge of which is substantially coincident with the leading edge of the first pulse of the pulse series $i$. As assumed, the switch arms 33, 33' are operated to the left contact studs 34, 34' which makes this positive pulse available for use in activating the sweep circuit 29 to produce the saw-tooth voltage $k$ (Fig. 2) at an adjustably delayed interval after the pulse $g$ is selected and before the delayed pulse $h$ is recreated.

Alternatively, if a short delay is to be imparted by the range unit 26, such as would be the case in calibrating small distance indications, the horizontal sweep of the cathode beam may be started prior to the start of the delay interval in order that the degree of coincidence between the leading edges of the pulses may be inspected under the most advantageous circumstances. This may be accomplished by interchanging the pulses derived from the pulse selector and inverter 25 and the multivibrator peaker 28 by operating the switch wiper arms 33, 33' to the right contact studs 35, 35' in which positions the variably delayed pulse $j$ (Fig. 2) activates the range unit 26 an adjustably delayed period after the undelayed pulse $g$ has initiated the horizontal deflection of the cathode beam by the saw-tooth sweep voltage $k$.

Range unit 26 may be calibrated for relative distance indications by setting the unit initially for any desired delay interval to produce a pulse $h$ on the luminescent screen of the cathode-ray tube 30 a selected interval after pulse $g$. One of the pulses of series $c$ (Fig. 2) is then brought into coincidence with pulse $h$ on the tube screen by adjustment of the continuous phase shifter 21. The delay setting of the range unit may be increased or decreased by an interval designated as 500 yards, or any suitable multiple thereof, and the coincidence of pulse $h$ in its new position again checked for coincidence with one of the marker pulses of series $c$. If the leading edges of these oppositely directed pulses are not within the desired degree of coincidence, when viewed on the expanded scale of tube 30, the delay interval of range unit 26 may be adjusted by the required amount and the procedure repeated for the same or different values of delay settings of unit 26.

Figures 3, 7:
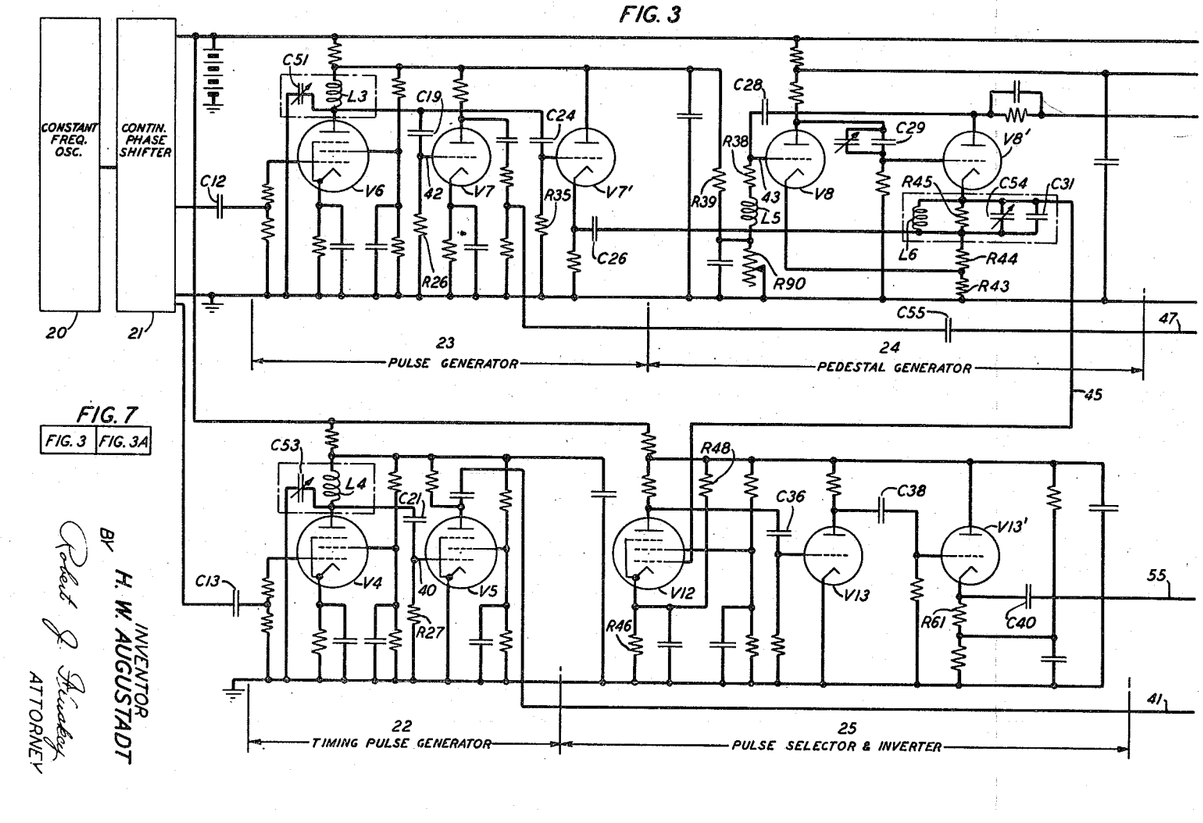
Figs. 3 and 3A, when arranged as indicated in Fig. 7, show a schematic circuit diagram of the apparatus of Fig. 1.
Figure 3A:
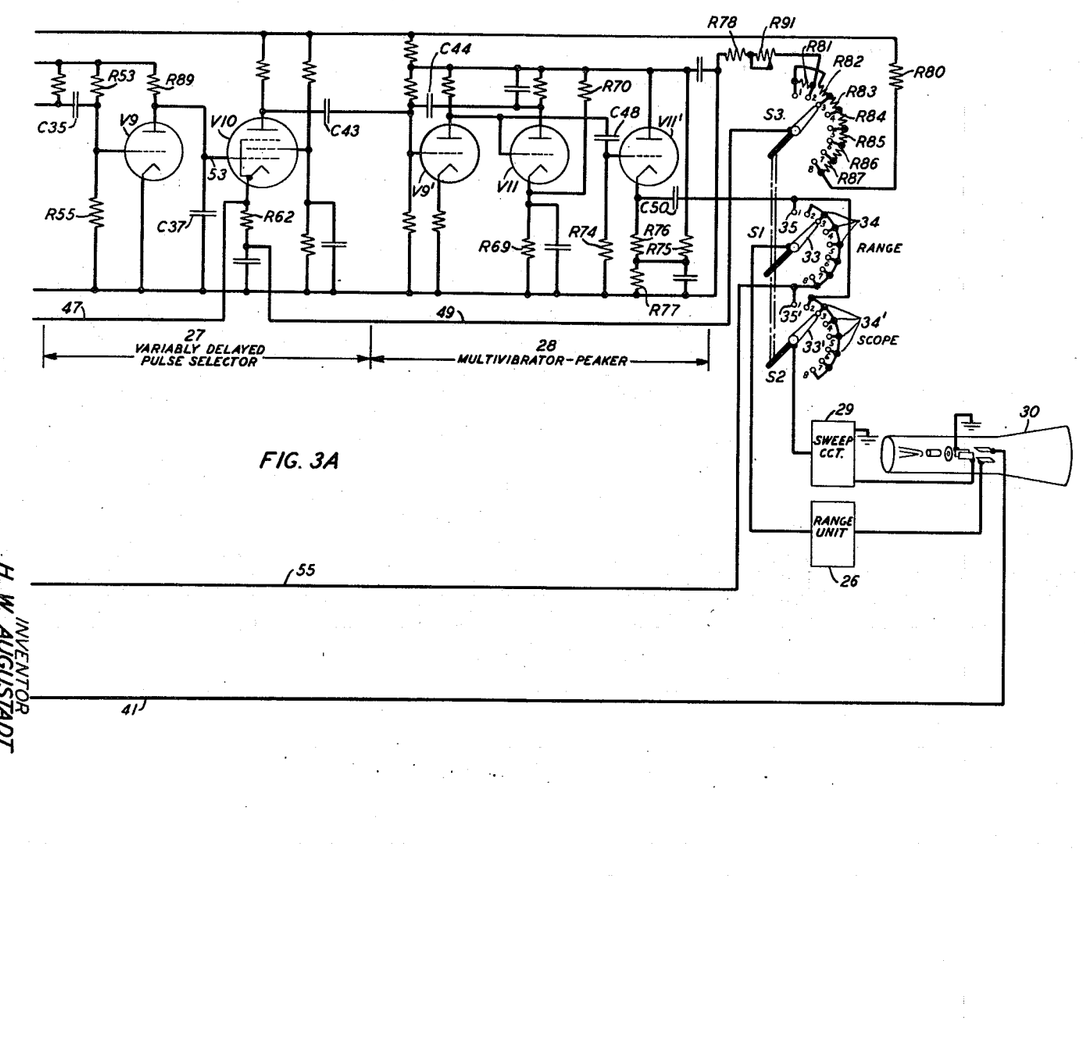

Figs. 3 and 3A indicate in schematic form one embodiment of the invention for testing a range unit 26 having a nominal repetition rate of 480 cycles per second and a maximum range indication of 60,000 yards corresponding to a time delay interval of about 366 microseconds. The general operating features of this arrangement were explained in connection with the preceding discussion of Figs. 1 and 2. Constant frequency oscillator 20, which may be of any suitable design capable of sustained oscillation at a frequency of 327.80 kilocycles within ±.01 per cent, produces an essentially sine wave output $a$ (Fig. 2), one portion of which may be shifted in phase through any fractional part of a complete cycle in the continuous phase shifter 21. This phase shifter may be any of a number of suitable types, several of which were described by F. A. Everest in the publication "Electronics," volume 14, page 46, of November 1941. The phase shifted portion $b$ of this output wave $a$ is delivered through condenser C13 to the timing pulse generator 22, where timing pulses are derived from successive cycles of the wave, and may be said to be separated by 500 yards, or delayed 500 yards with respect to each preceding pulse as previously indicated. In order to synchronize the timing pulses $c$ with the pulses $d$ and $e$ to be used for activating the range indicator unit and the sweep circuit and to rigidly maintain their positions relative to a prescribed angular position of the constant frequency wave $a$, they are derived from a timing wave in which the voltage increase per angular degree, or per yard, is high. Because the phase shifted wave $b$ has a relatively low voltage amplitude, vacuum tube V4 is arranged to furnish a high gain by connecting an anti-resonant circuit, comprising the coil L4 and condenser C53, tuned to 327.8 kilocycles in its plate circuit. This tube thus delivers a sine wave of about 300 volts peak value to the control grid 40 of the succeeding tube V5. Grid rectification and current flow in resistor R27 causes the building up of a negative bias across the condenser C21 and cuts off tube V5 for all except the peak voltage values. When condenser C21 has a capacity value of 100 micromicrofarads and resistance R27 has a value of 1 megohm, tube V5 is not conductive until the applied voltage wave reaches an angular displacement in excess of 68 degrees at which time its voltage slope is increasing at the rate of approximately 1.3 volts per yard. With this rapid voltage increase being applied to the control grid it may readily be seen that normal voltage variations are of minor consideration, and the derivation of the timing pulse is accurately positioned in the rotational cycle of the timing wave. Negative voltage pulses ($c$ of Fig. 2) spaced 3.05 microseconds, or 500 yards, apart are derived from the plate circuit of tube V5, and are applied to one of the vertical deflection plates of the cathode ray tube 30 to produce on the tube screen deflections, or "pips," at separations equivalent to 500 yards.

The unshifted portion of the oscillator 20 output is connected through condenser C12 to the control grid of vacuum tube V6 in pulse generator 23. In order that the voltage pulses derived from this timing wave may accurately be synchronized and in coincidence with the voltage pulses $c$ derived from the timing pulse generator 22, the anode circuit of tube V6 includes an anti-resonant circuit comprising inductance coil L3 and capacitor C51 tuned to 327.8 kilocycles. As in the case of the timing pulse generator 22, this arrangement delivers a highly positive voltage wave to the control grid 42 of vacuum tube V7 in which grid rectification occurs on the positive half cycle. Condenser C19 may have a capacity of 100 micromicrofarads and the resistance of R26 may be 1 megohm to duplicate the pulse producing action of the conjugate generator 22. From the foregoing, it will be seen that the voltage pulses derived in the anode circuits of tubes V7 and V5 each have an unusually steep front because of the high voltage increase of the control wave, and similarly because of this high voltage increase each wave is derived at substantially a point equivalent to 68 degrees in the rotational cycle of the applied control wave. In addition to the negative voltage pulses $e$, which are derived from the plate circuit of the triode V7, a series of positive voltage pulses $d$ are derived from triode V7' which is connected in parallel with triode V7, and arranged as a cathode follower. Condenser C24 and resistance R35 in the control grid circuit of vacuum tube V7' have the same values as the corresponding elements in the control grid circuit 42 of triode V7.

Pedestal generator 24 comprising the triodes V8 and V8' is connected as a multivibrator oscillator. The anode of tube V8' is connected through coupling condenser C28 to the control electrode 43 of tube V8. Control electrode 43 of tube V8 is biased positively through the voltage divider comprising resistances R39 and R90 and inductance coil L5 and resistance R38 in series. As will be later explained in connection with Fig. 4, inductance L5 and condenser C28 form a series resonant circuit for materially linearizing the grid voltage increase on the control electrode 43 of tube V8. This arrangement insures that the multivibrator oscillator will be reversed on one of the control voltage pulses derived from the triode V7' instead of reversing because of its own natural period of oscillation. The cathode circuit of triode V8' includes an anti-resonant wave forming network comprising inductance coil L6, which may have an inductance of 14½ milhenries, and capacitors C31 and C54 in parallel, the combined capacity of which may be approximately 275 micromicrofarads. This combination is resonant at a frequency of about 80 kilocycles and is critically damped by the 20,000-ohm resistance of R45 and the internal resistance of the triode V8' during its conduction cycle. The oscillator components are so proportioned that its free running frequency is adjusted to something less than the desired controlled frequency, for example, 470 cycles per second. Positive voltage pulses $d$, derived from the cathode circuit of triode V7', are coupled through condenser C26 and coil L6 to the cathode of V8'. These positive pulses are also applied to the cathode of triode V8 through the voltage divider comprising resistances R43 and R44. Reversal of the oscillator is brought about through the positive voltage pulse generated in the anode circuit of the conducting triode at the time a positive pulse is applied to the cathode of that tube. Assuming current conduction in triode V8, positive voltage pulses applied through the voltage dividers R44, R43 generate, in the anode circuit of V8, positive voltage pulses which are coupled through condenser C29 to the control electrode of triode V8'. These positive voltage pulses induce conduction in the triode V8' at such time as its control grid voltage has sufficiently recovered from its negative excursion, and therefore reversal of the oscillator is coincident with the positive voltage pulse $d$ from the pulse generator 23. Because of the self-inductive properties of coil L6, a counter-electromotive force is generated in opposition to the flow of current through this coil, and condenser C31 is therefore charged positively with respect to ground, giving rise to the wave form $f$ (Fig. 2). As previously stated, this wave $f$ has a nominal frequency of 80 kilocycles. Therefore, the pulse next succeeding the positive pulse which caused the reversal of the multivibrator sits atop this voltage wave as indicated by pulse 32 on the wave $f$. The pulse second succeeding the reversing pulse sits on the negative slope, at a point about 20 volts below the peak voltage of the wave $f$, and exerts no influence on the control grid of the pentode V12 of the pulse selector and inverter 25. Triode V12, the cathode of which is connected to the voltage divider comprising resistance R48 and R46, is normally nonconductive. The voltage at this point of connection is so proportioned that the voltage of wave $f$ plus the voltage of the surmounting positive pulse 32 is just sufficient to unblock this unit, and produce a negative pulse in its anode circuit. This negative pulse when coupled through coupling condenser C36, triode V13 and condenser C38 produces its positive voltage counterpart $g$ at the cathode end of resistor R61 in the cathode circuit of triode V13', which operates as a cathode follower. This pulse $g$ (Fig. 2) is coupled through coupling condenser C46 to the multiple contact 34 of range switch S1 and to the single contact 35' of the scope switch S2 for use as will be later explained.

In addition to the positive voltage wave $f$, triode V8' produces in its anode circuit a square top voltage wave (indicated in Fig. 1). This square top wave is coupled to the grid of triode V9 through the coupling condenser C35. Triode V9 is normally conductive, its control grid being connected to the voltage divider comprising resistors R53, R55, and therefore capacitor C37 in its anode circuit is normally discharged to a voltage equivalent to the voltage drop in this triode. Application of the negative portion of this square wave voltage from triode V8' through condenser C35 renders triode V9 non-conductive, and starts the charging of condenser C37 from the plate voltage source through resistor R89. The control electrode 53, of pentode V10, is connected to the anode side of condenser C37, and rises in voltage as this condenser charges. The cathode of pentode V10 may be made positive with respect to ground by suitably varying amounts by virtue of its connection from the lower end of resistance R62 through conductor 49 to the wiper arm of switch S3. It will be noted that resistors R80, R81 to R87, inclusive, R78 and R91 form a voltage divider between ground and the source of positive voltage potential. Contact studs of switch S3 form a means of selectively choosing a voltage value above ground for application to the cathode of pentode V10, thereby rendering this valve non-conductive until condenser C37 has acquired a charge sufficient to overcome this cathode voltage. In passing, it might be noted that by virtue of the connection to resistor R81, the cathode of V10 is more positive on step 1 than on step 2 of switch S3. This provision is made in order to introduce a small amount of time delay in the pulse formed in this branch of the circuit, when this pulse is used to activate the range unit under test by operating switch S1 to contact 35. Under these circumstances, the sweep circuit 29 is activated in advance of the range unit 26, thereby providing means for visibly inspecting the degree of pulse coincidence at short ranges of the range unit under test. Resistances R81 to R87, inclusive, are optionally chosen to introduce the desired time delay in the activation of pentode V10. Their only requirement is that they be of proper values to cause overlapping of the horizontal deflection of the cathode beam by the sweep circuit 29, for adjacent steps of switch S3. The triode V10 will be activated by the rising positive voltage of condenser C37, at a time when this voltage is sufficient to overcome the positive voltage applied to its cathode through switch S3 as previously described. As previously mentioned, negative voltage pulses e are produced in the anode circuit of triode V7 of pulse generator 23. These pulses e are applied over conductor 47, to the cathode of pentode V10 in opposite polarity to the voltage derived through switch S3. At such time as the grid-cathode voltage of pentode V10 acquires a value such that the magnitude of the negative pulse e will render the tube conductive, a series of negative pulses i (Fig. 2), synchronous with the timing pulses c generated in timing pulse generator 22, will be formed in the anode circuit of pentode V10.

Multivibrator-peaker 28 is arranged as a single trip multivibrator with the cathode of its triode V11 connected to the voltage divider comprising resistances R69 and R70. The resistance values of these elements are so proportioned that triode V11 is normally non-conducting. The first pulse of the series of negative voltage pulses i (Fig. 2), when applied through the coupling condenser C43, renders the triode V9' non-conductive. Non-conduction in triode V9' drives triode V11 to full conduction in the usual manner, with an attending voltage drop at its anode which, through coupling capacitor C44, in turn reduces the control grid voltage of V9' to a point where this tube is insensitive to the succeeding negative pulses of the series i. At the same time that conduction is forced in triode V11, triode V11' receives a sharp positive voltage pulse at its control electrode, which pulse is coincident in time with a corresponding timing pulse derived from pulse generator 23. This pulse is received through the differentiating action of the voltage divider comprising the capacitor C48 and the resistor R74, between the anode of triode V9' and ground, since the control electrode of tube V11' is connected to the anode end of resistor R74. Triode V11' is normally non-conductive by virtue of the positive bias imparted to its cathode by its connection to the voltage divider R75, R77. The voltage pulse j, caused by current conduction through cathode resistor R76, is connected through condenser C50 to switch stud 35 of range switch S1, and to the multiple contacts 34' of scope switch S2.

Assuming the switches S1, S2 and S3 to be positioned as shown on the drawing, the utilization of these produced pulses would be as follows. Negative voltage pulses c are applied from timing pulse generator 22 over conductor 41 to one of the vertical deflection plates of cathode ray tube 30, where they cause a series of timing or marker "pips" spaced 500 yards apart on the luminescent screen of this tube. The positive voltage pulse g produced by the pulse selector and inverter 25 is delivered to the range switch S1 over conductor 55 where by transfer to wiper arm 33 it activates the range unit 26. Delayed pulse h, from range unit 26 is applied to the conjugate vertical deflection plate of cathode ray tube 30 to cause a "pip" opposite in direction to that caused by the timing marker pulse c. The sweep circuit 29 is activated by the positive pulse j, which is obtained from triode V11', to produce the high speed saw-tooth voltage wave k (Fig. 2). This wave may be used to "sweep" the cathode beam across a horizontal dimension of the luminescent screen of the cathode ray tube 30. The cathode beam may be displaced at any suitable rate, that is sufficiently high to permit an accurate determination of the degree of coincidence existing between the leading edges of the delayed range pulse h and a corresponding one of the timing pulses c. It will be recalled that this voltage pulse j (Fig. 2) has been variably delayed by the variable delay pulse selector 27 with respect to the positive voltage pulse g from pulse selector and inverter 25.

Alternatively, operation of the switches S1, S2, and S3 to their lowest step interchanges the function of the positive voltage pulse g obtained from the pulse selector and inverter 25 with the function of the pulse j from the multivibrator-peaker 28. This arrangement is intended to permit viewing the coincidence of the pulses for small delay intervals. Consequently, switch S3 on step 1 introduces more delay in the pulse j than it does when on step 2 since in the former position this pulse j is used to activate the range unit 26 after the sweep circuit 29 has been activated by pulse g.

Figure 4:
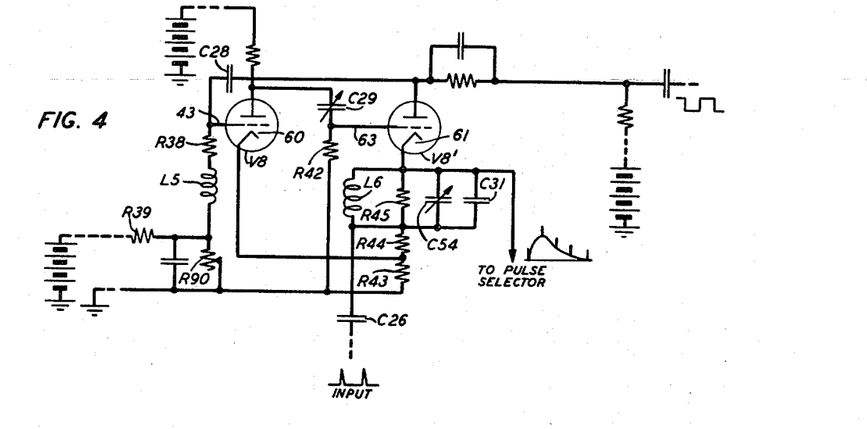
Fig. 4 is a circuit diagram of the relaxation oscillator in accordance with the invention.
Figure 5:
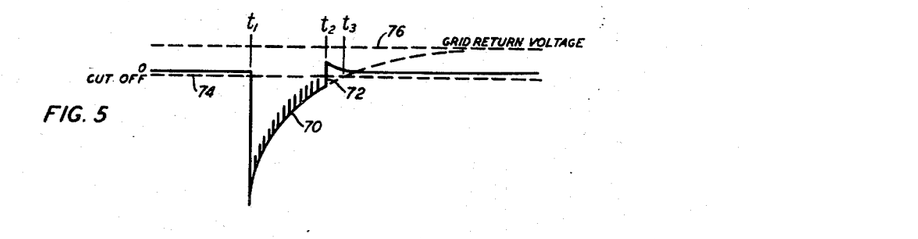
Figs. 5 and 6 are graphical representations of the grid voltage increase in the oscillator of Fig. 4, reference to which will be made in explaining the operation of the oscillator.
Figure 6:
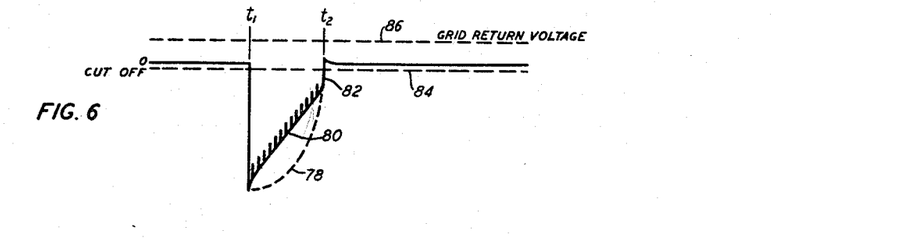

In discussing the pedestal generator 24 of Fig. 3, reference was made to the resonant tuning of the circuit coupling the anode of triode V8' to the control grid 43 of triode V8. Fig. 4 shows a detailed schematic of this multivibrator oscillator, and Figs. 5 and 6 diagrammatically illustrate the voltage increase on the control grid electrode 43, with and without this resonant circuit. Referring now to Fig. 4, the anode of triode V8 is connected to the control grid 63 of triode V8' through coupling capacitor C29 and resistor R42 arranged as a differentiating network in the usual manner. The anode of triode V8' is connected to the control electrode 43 of triode V8 through a .01 microfarad coupling capacitor C28 arranged in a series resonant circuit with a one-tenth megohm resistor R38 and 26-henry inductance coil L5. The lower connection of coil L5 is connected to a voltage divider comprising means for adjusting the free running frequency of oscillation of this unit. The cathode 61 of triode V8' is connected to ground through an anti-resonant circuit in series with resistors R44, R43 arranged as a voltage divider coupling the input pulses to the cathode 60 of V8. The anti-resonant circuit comprises a 14-millhenry inductance coil L6 in parallel with resistance R45 of 20,000 ohms and variable capacitors C31, C54, proportioned so as to have a natural frequency of oscillation of about 80 kilocycles. Although here shown as being included, this anti-resonant circuit is not essential to the operation of this unit as a controlled multivibrator, and it is evident that it may be eliminated by connecting the cathode 61 directly to the upper terminal of resistance R44. With the exception of capacitor C28 and inductance coil L5, all of the components of the multivibrator may be chosen in accordance with known design considerations. Capacitor C28 and coil L5 are so chosen as to be resonant at a frequency slightly less than one-half of the desired controlled oscillating frequency. As previously stated, adjustment of the voltage divider comprising resistances R39, R90 enables securing the desired free running frequency. Introduction of positive voltage pulses in the cathode circuit of one of the tubes, while that tube is conducting, gives rise to positive voltage pulses in the anode circuit of that tube. These voltage pulses, when impressed upon the rising grid voltage of the conjugate tube, bring about reversal of the oscillator when the combined grid plus positive pulse voltages exceed the cut-off value of the non-conducting tube. In Fig. 5 this condition is shown for a conventional multivibrator not having the series resonant circuit of this described unit. Referring to that figure, at time t1 the voltage of the control electrode 43 has been driven negatively by the anode voltage drop received from the conjugate tube V8'. This control electrode voltage increases exponentially, depending upon the RC value of the coupling capacitor and associated grid leak resistor, until, at time t2, pulse 72 plus the increased grid voltage is sufficient to raise the control electrode voltage to a value exceeding cut-off voltage 74, and conduction is resumed in tube V8. If no control voltage impulses, such as pulse 72, had been superimposed upon this rising grid voltage 70, the coupling condenser would have continued to charge along the exponential curve as indicated by the dotted portion of curve 70, until the control electrode voltage had at time t3 exceeded the cut-off voltage 74 to initiate current conduction.

With the introduction of the inductance coil L5 in series connection with the coupling capacitor C28 and the resistance R38, the increase in the voltage on the control electrode 43 is modified as indicated in Fig. 6. When the coupling capacitor C28 and the inductance L5 are so proportioned as to be resonant at a frequency substantially equal to one-half of the free running frequency of the oscillator, the rate of change of the voltage on the control electrode 43 is considerably increased in the vicinity of the "cut-off" voltage 84 of the tube. This increased rate is indicated by curve 80 (Fig. 6), when compared to the voltage increase curve 70 (Fig. 5) for the condition without the coil. This increased rate of voltage rise is believed to be due to the self-inductive properties of the inductance L5, by which it tends to oppose a change in the current flowing through the coil. At time t1 (Fig. 6) the voltage on the control electrode 43 is driven negatively, as the anode voltage of the triode V8' is lowered by conduction in that tube. Capacitor C28 immediately starts to equalize the voltage difference between its plates by discharging through the inductance L5 and resistance R38. At the same time the inductance L5 offers its maximum opposing electromotive force because of the high rate of change of current flow. As this discharging operation proceeds the rate of change of current flow is decreased, and as maximum current flow is approached the opposing electromotive force is decreased, thus permitting a high rate of voltage increase on the control electrode 43 in the critical "cut-off" region. If the resistance R38 were completely removed and if purely reactive components were available for use in place of capacitor C28 and inductance L5, it is believed the voltage on the control electrode 43 would rise from its negative value at time t1 to its cut-off voltage 84 at time t2 along the theoretical cosine curve 78. Because resistanceless circuit components are not realizable the theoretical voltage increase, curve 78, may not be achieved. However, the linearizing effect of this resonant combination may be realized as indicated by curve 80. This effect may be reduced or enhanced by suitably changing the value of the resistance R38, even to the point of eliminating this component if desired.

As was previously explained, the oscillator is reversed at time t2 when the rising electrode voltage plus the voltage of the superposed control pulse 82 are sufficient to exceed the cut-off voltage 84 of the tube, and render triode V8 conductive. From the foregoing it is apparent that the frequency of oscillation of the multivibrator may be controlled with an exceptional degree of precision, when control pulses of suitable magnitude are combined with this rapidly rising electrode voltage. Additionally, the free running frequency of the oscillator is greatly stabilized, since the increased rate of rise in the control voltage tends to minimize the effect of power source fluctuations.

Although this invention has been described in connection with a range indicating unit, and specific frequencies and circuit component values have been enumerated, it is apparent that the invention is not limited to this application or to such values since, modifications of the disclosed embodiments within the spirit of the invention will undoubtedly occur to those skilled in the art.

A divisional application directed to the relaxation oscillator circuit arrangement of the present disclosure has been filed December 20, 1948, Serial No. 66,381, for the improvement in Alternating Wave Generator.

What is claimed is:

1. Electric delay measuring apparatus comprising a cathode-ray device having means for directing a cathode-ray beam to a luminescent screen, and deflecting means for moving the beam along two rectangular coordinates, oscillatory means for producing a first and a second portion of a constant frequency alternating electric wave, phase shifting means for changing the phase relation of said second portion with respect to said first portion by any fractional part of a complete cycle, means responsive to said phase displaced second wave portion for producing a first series of recurring pulses the frequency of recurrence of which is equal to the cyclical frequency of said second wave portion, means controlled by said first wave portion for producing a second series of recurring pulses the frequency of recurrence of which is at all times an integral submultiple of said first and second wave portions, means responsive to said second series of pulses for producing a third and a fourth series of pulses having frequencies of recurrence equal to that of said second series of pulses, said fourth series of pulses being delayed with respect to corresponding pulses of said third series of pulses by a variable interval, means responsive to said third series of pulses for producing a fifth series of pulses the period of which is equal to that of said third and fourth series and which pulses may be delayed by a variable interval with respect to corresponding pulses of said fourth series, means controlled by pulses of said first and fifth series for causing the deflection of said cathode-ray beam along one of said coordinates, means responsive to the delayed pulses of said fourth series of pulses for causing the deflection of said cathode-ray beam along the second of said coordinates; said deflection being initiated subsequent to corresponding pulses of said third series and prior to corresponding pulses of said fifth series of delayed pulses, whereby the degree of coincidence of the deflections caused by the pulses of said first and fifth series of pulses may be portrayed on an expanded scale.

2. In an electrical delay measuring apparatus for testing a range measuring device by measuring the relative delay intervals introduced into a pulse producing circuit by said device, in which apparatus a plurality of unit delay designating marker pulses are displayed as a series of unidirectional pulses along one coordinate of a cathode beam tube luminescent screen, a single delayed range pulse is displayed as an oppositely directed unidirectional pulse along the same coordinate and the cathode beam of said tube is progressively moved along a perpendicularly related coordinate to visibly indicate the degree of coincidence existing between said range pulse and a corresponding one of said marker pulses, means for delaying the start of said pulse delaying interval until after a time corresponding to the start of said beam moving operation, said means comprising means for generating a first series of voltage pulses of substantially constant frequency of occurrence, means responsive to said first series of pulses for producing a second series of pulses the phase relationship of which is substantially constant with respect to the pulses of said first series and the frequency of occurrence of which is an integral submultiple of said first series, means responsive to each pulse of said second series for repetitively initiating the progressive deflection of said cathode beam, variable selective means responsive to the pulses of said second series for selecting a designated one of the pulses of said first series of pulses, means responsive to said selected pulse for producing a range indicating pulse the time of occurrence of which is delayed with respect to said selected pulse and means for applying said delayed pulse to said cathode beam tube to cause a range indicating deflection along one coordinate thereof.

3. In an electrical delay measuring apparatus which includes a cathode-ray oscilloscope having deflecting means for moving the electron beam along horizontal and vertical coordinates on its luminous screen, means for generating a continuous constant frequency alternating electrical wave, means under the control of, and responsive to, said wave for producing a first series of voltage pulses the frequency of recurrence of which is the same as the cyclical frequency of said wave, means under the control of and responsive to said first series of pulses for producing a second series of pulses, the frequency of recurrence of which is an integral submultiple of the frequency of said first series of pulses, delay means under the control of and responsive to said second series of pulses for producing a third series of pulses having the same recurrence rate as said second series of pulses but the individual pulses of which are delayed with respect to corresponding pulses of said second series, means under the control of and responsive to pulses of said first and second series of pulses for producing a fourth series of pulses, the period of which is the same as that of said second series of pulses, but the time of occurrence of each of which is delayed with respect to corresponding pulses of said second series and is in coincidence with specific ones of said first series of pulses, and means for displaying the degree of coincidence between the pulses of said first and third series of pulses, said means comprising said oscilloscope having means under the control of and responsive to said first and third series of pulses for deflecting its electron beam along its vertical axis, and having horizontal deflecting means the actuation of which is under the control of and responsive to said fourth series of pulses, whereby the electron beam is deflected along the entire horizontal axis in a period less than the pulse recurrence period of said third series of pulses.

HERBERT W. AUGUSTADT.

REFERENCES CITED

The following references are of record in the file of this patent:

UNITED STATES PATENTS

| Number | Name | Date |
| --- | --- | --- |
| 2,375,709 | Thompson | May 8, 1945 |
| 2,414,477 | Meacham | Jan. 21, 1947 |
| 2,417,522 | Shenk | Mar. 18, 1947 |
| 2,418,364 | Moe | Apr. 1, 1947 |
| 2,419,772 | Gottier | Apr. 29, 1947 |
| 2,420,211 | Tourshou | May 6, 1947 |
| 2,421,606 | Fitch | June 3, 1947 |
| 2,424,999 | Ostlund et al. | Aug. 5, 1947 |
| 2,426,910 | Wilson | Sept. 2, 1947 |
| 2,434,264 | Edson | Jan. 13, 1948 |
| 2,448,363 | Firestone et al. | Aug. 31, 1948 |
| 2,454,782 | De Rosa | Nov. 30, 1948 |
| 2,496,970 | Wertz | Feb. 7, 1950 |